Figures 1, 2:
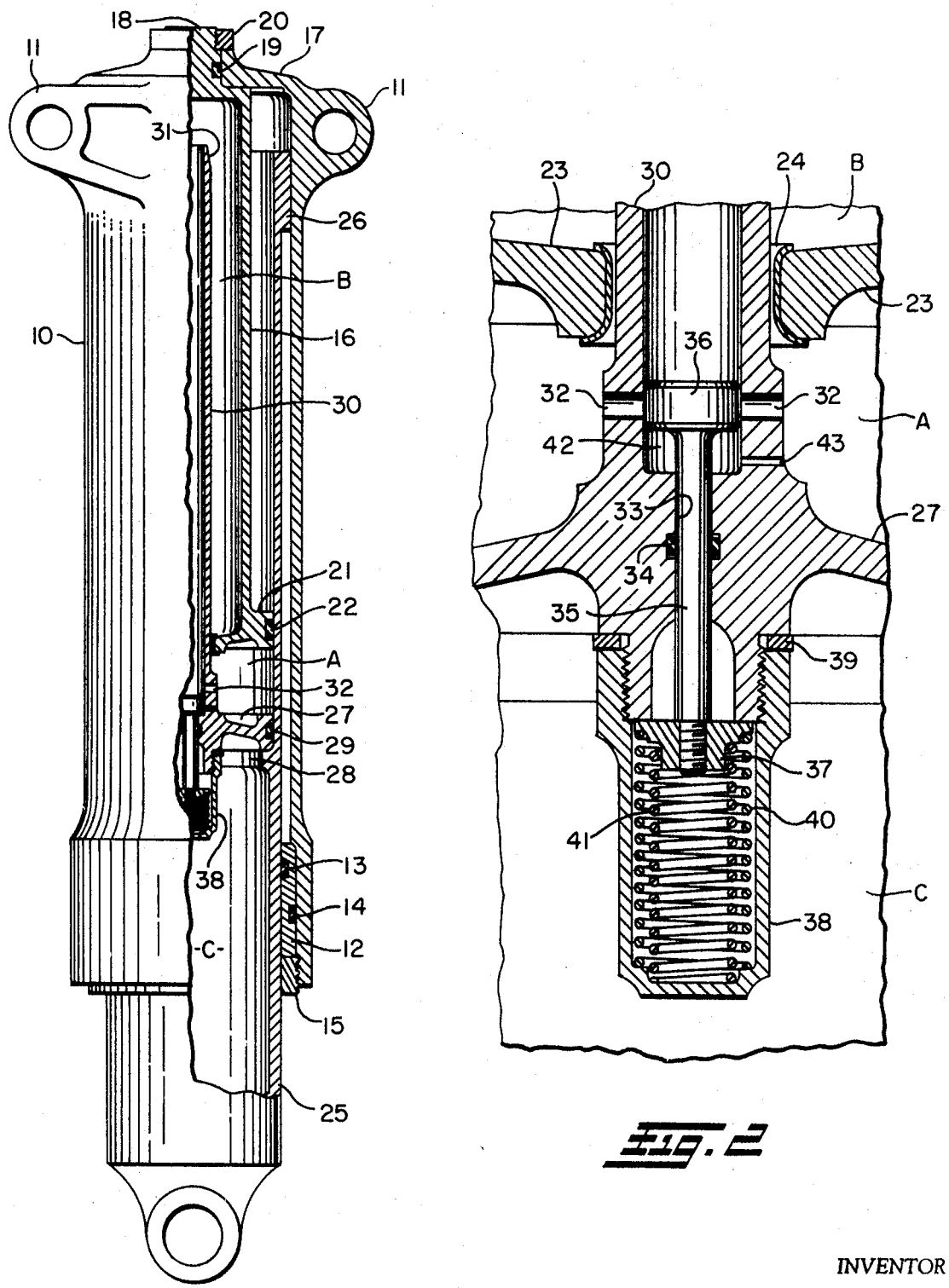

United States Patent

[11] 3,598,207

| [72] | Inventor | Erwin Horst Hartel<br>Brunswick, Ohio |
|---|---|---|
| [21] | Appl. No. | 794,681 |
| [22] | Filed | Jan. 28, 1969 |
| [45] | Patented | Aug. 10, 1971 |
| [73] | Assignee | Pneumo Dynamics Corporation<br>Cleveland, Ohio |

[54] DUAL MODE SHOCK STRUT
9 Claims, 2 Drawing Figs.

| [52] | U.S. Cl. | 188/289 |
|---|---|---|
| [51] | Int. Cl. | F16f 9/342 |
| [50] | Field of Search | 188/88.501, 88.503, 88.505, 88.509, 88.510, 88 BA, 88 BB, 96.51, 96.9, 96.52 |

[56] References Cited
UNITED STATES PATENTS

| 2,735,674 | 2/1956 | Smith et al. | 188/88 BA UX |
| 2,916,281 | 12/1959 | Hehn | 188/88 (.503) X |
| 3,458,016 | 7/1969 | Keech | 188/88 (.503) X |

Primary Examiner—George E. A. Halvosa
Attorney—Stephen M. Mihaly

ABSTRACT: Increase in static internal pressure in the strut after landing of the aircraft opens a bypass valve paralleling the standard flow area to provide a softer vertical load response for taxiing.

INVENTOR
ERWIN HORST HARTEL
BY Stephen M. Mihaly
ATTORNEY

DUAL MODE SHOCK STRUT

This invention relates to an improved shock strut for aircraft landing gear and has for a primary object the provision of a strut having two operating modes, with one providing the usual landing shock absorption and the other a relatively softer mode for cushioning shock experienced in taxiing the aircraft on the ground.

The basic strut form is that of a liquid spring comprising, conventionally, a metering pin for regulating the displacement of hydraulic fluid which occurs within the spring in its extension and compression. When the strut is free of load it is held fully extended by pressurized air over the liquid; the application of landing shock causes the liquid to be displaced through an orifice in which the pin moves relatively and is contoured to provide increasing constriction of the orifice to build up the liquid pressure and thereby absorb the shock energy. The velocity of the relative movement of the pin and orifice which determines this build up decreases as the strut compresses and the flow area of the orifice becomes very small near the fully compressed condition of the strut in aircraft of the sizes used commercially for passenger transport.

As a result of this small flow area for the liquid in the struts of the grounded aircraft, rapid velocity shocks which may be applied in taxiing, for example, by a bumpy runway or the landing gear rolling over an obstacle, produce substantial hydraulic pressures and consequent relatively large vertical reactions on the aircraft. The resulting jouncing of the aircraft as it rolls over the ground is clearly undesirable from the standpoint of passenger comfort and may become a factor in fatigue analysis of the landing gear and aircraft structures. This last concern is of increasing importance in some of the proposed designs for very large aircraft which have high fineness ratios, that is, length in proportion to diameter, and long wing attachments to the fuselage. With the gear attached to the wings, supporting the total weight at concentrated points in such designs, hard taxi loads can impose severe structural load on certain sections of the fuselage.

It is therefore desirable and may, in some cases, be essential, that aircraft landing gear have a softer taxiing mode, and the present invention further provides a strut in which the adjustment to the second and softer mode is automatically and reliably effected by readily incorporated improvement in the basic strut form.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is an elevation of an aircraft shock strut in accordance with the invention shown partially in longitudinal section; and FIG. 2 is a fragmented transverse section of part of the strut on an enlarged scale.

Referring now to the drawing in detail, the illustrated embodiment of the invention comprises a cylindrical outer casing 10 formed at its upper end when vertical with apertured lugs 11 for mounting this part of the strut on the aircraft. The lower end of the casing is open and has an inner relief in which a bushing 12 is seated, with internal and external packings 13, 14, and held in place by a bushing retainer nut 15 threaded into the bottom of the casing.

The outer casing also mounts a concentric inner casing 16 which extends from an abutting engagement with the upper end 17 of the casing 10 to an intermediate point in the lower half of the same. The connection of the inner and outer casings is provided by a reduced diameter and extension 18 of the former which projects through an axial opening in the outer casing end, with an intervening packing 19, and has an exposed threaded length on which a nut 20 is tightened against the casing end 17. The inner casing is thus fixed relative to the outer casing and is formed at its lower end as a stationary piston 21 carrying a package 22 and also as a cross plate 23 having a central orifice 24.

A lower cylindrical casing 25 adapted to be attached to the wheel structure at its lower end is slidably telescoped with both the outer casing 10 and inner casing 16 between the two. Exteriorly, the lower casing is supported by the bushing 12 and it is provided with an inner upper end bearing 26 in engagement with the inner wall of the outer casing. In fitting over the inner casing 16, the lower casing engages the stationary piston 21 at the bottom of the former.

A metering pin bulkhead 27 is disposed within the lower casing 25 below the stationary orifice plate 23 and above an annular stop 28 formed in the inner surface of the lower casing. Bulkhead 27 is sealed by a packing 29 to the lower casing and serves as an integral base for a hollow metering pin 30 extending axially upwardly through the orifice 24. The pin, having its exterior upper end surface tapered as shown at 31, has a plurality of radial bypass ports 32 below the plate 23 and a small bore 33 extends fully through the bulkhead to receive, within a packing 34, a valve plunger 35 having a head 36 in the lower part of the pin.

A retainer nut 37 is threaded on the lower end of the plunger and a cap 38 is threaded on the bulkhead against a washer 39 to contain two coil springs 40, 41 which exert a predetermined spring force against the nut and hence the valve plunger in the upward direction. That part of the metering pin interior below the bypass ports 32 and the plunger head as shown forms a small valve chamber 42, and the latter is provided with a passage 43 to the exterior space between the bulkhead 27 and orifice plate 23.

The space between the orifice plate 23 and metering pin bulkhead 27 forms a hydraulic chamber A filled with liquid, such as oil, while the space above the orifice plate forms a hydropneumatic chamber B partially filled with liquid under pressurized air. The chamber C below the bulkhead is also filled with air at relatively high pressure, with appropriate valving (not shown) provided for charging the chambers B and C.

The operation of the strut will be best understood by assuming that it is mounted on an aircraft in flight and fully extended for landing. The air pressure in this condition may, for example, be 200 p.s.i. and will be the same both above and below the orifice 24 and also in the pin bottom chamber 42. The resultant net force on the valve plunger 35 is accordingly this pressure times the effective hydraulic area at the packing 34, and it will be assumed that this area is 0.4 sq. in., for a net force of 80 lbs. on the plunger. The springs 40, 41 will be assumed to have a joint force output of 100 lbs., so that the plunger has a net force acting on it of 20 lbs. holding it in its uppermost position shown, with the bypass ports 32 blocked by the plunger head 36.

When the landing gear contacts the runway in landing, the bulkhead 27 advances on the orifice 24 and thereby places the oil in the chamber A under pressure. The controlled flow area between the orifice internal diameter and the metering pin outside diameter will maintain a pressure differential between this hydraulic chamber and the upper portion of the shock strut which will still be at the 200 p.s.i. as the strut begins to compress. The pressure increase in the chamber A will be transmitted to the small valve chamber 42 through passage 43 and, acting against the area of the plunger head 36, will tend to maintain the plunger in the illustrated closed position since the other side of the head is still subjected to the lower pressure in the upper end of the strut. Accordingly, this valving arrangement insures closure of the bypass ports 32 during the first landing stroke when the hydraulic pressure in the chamber A is always greater than that existing in the upper end of the shock strut.

When the aircraft has stopped its vertical sink velocity, the hydraulic pressure buildup in the chamber A ceases and the pressure is the same in both this chamber and the upper chamber B of the strut. The valve plunger head thus is now exposed to the same pressure at both sides, and the net force on the same is the higher internal pressure times the hydraulic area of the packing 34. An internal pressure in excess of 250 p.s.i. produces an opening force greater than the spring force and, with a normal static internal pressure during taxiing of about 1,600 p.s.i., a hydraulic force of about 640 lbs. acts on the plunger or well more than the spring force. The valve plunger as a result is moved toward the springs, with oil in the small valve chamber 42 escaping through the passage 43, and the bypass ports 32 are opened to provide a fixed orifice paralleling the conventional flow area at the metering orifice 24.

As a result of the above valving, dynamic pressures are much lower and vertical loads which may be imposed on the aircraft as it rolls over ground obstructions will be substantially reduced, with the compressible air in the upper chamber providing the desired soft cushioning mode. When the aircraft leaves the ground, the return of the strut internal pressure to the normal lower value of the air charge results in spring return of the valve plunger to the bypass blocking condition.

The new strut will accordingly be seen to include a pressure operated and cycle controlled bypass valve parallel to the flow area at the metering pin for shifting the hardness of the strut after the aircraft has landed from a hard vertical load response to a soft vertical load response.

I, therefore, particularly point out and distinctly claim as my invention:

1. A dual mode shock strut for an aircraft having a relatively hard vertical load response for landing and a relatively soft vertical load response for taxiing, comprising outer and inner telescoping casings defining a pair of chambers containing pressurized air and hydraulic fluid, one of said casings including an orifice plate the orifice of which provides a primary path of communication between the chambers through which fluid is displaced in compression of the strut, the other of said casings carrying a metering pin which moves relatively through the orifice to control the flow area as the strut compresses under landing shock to provide said relatively hard vertical load response, means forming a secondary path of fluid communication between the chambers in parallel to said orifice, and bypass valve means for normally closing said secondary path and opening the same responsive to attainment in both said chambers of the higher internal pressure which exists in the compressed strut in its ground support of the aircraft, thereby to increase the effective area for flow of fluid between the chambers and provide the relatively soft vertical load response for taxiing.

2. A shock strut as set forth in claim 1, wherein the bypass valve means includes means for exerting a closing force on the same in response to a differential of the internal pressure in said chambers during landing of the aircraft.

3. A shock strut as set forth in claim 2 wherein said metering pin is tubular and includes bypass ports forming said secondary path of fluid communication, said bypass valve means comprising a valve plunger having a plunger head slidable in said metering pin for blocking and unblocking said bypass ports, said plunger head having opposing sides respectively in communication with said chambers for developing a net force on said plunger head dependent upon relative pressures in said chambers.

4. A shock strut as set forth in claim 3 wherein said bypass valve means further includes a spring biasing said plunger head to the blocking position, and said sides of said plunger head are of different areas for developing a net force when the pressure in said chambers is equalized.

5. A dual mode shock absorber having different vertical load responses for landing and taxiing conditions of an aircraft, comprising inner and outer telescoping casings partly defining first and second chambers for hydraulic fluid, said inner casing including an orifice in communication with said chambers, said outer casing supporting a metering pin for movement through said orifice to control fluid flow therethrough, means forming a second path for fluid flow between said chambers, a valve operative to open and close said second path, first means urging said valve to a normally closed position, second means urging said valve to an open position, and third means urging said valve to the closed position, said second and third means providing variable forces dependent upon the relative pressure in said first and second chambers, respectively.

6. A shock absorber as set forth in claim 5 wherein said second and third means are responsive to fluid pressure in said first and second chambers respectively to develop a net force urging said valve to the open position when the pressures in said chambers are equal.

7. A shock absorber as set forth in claim 6 wherein said third means is operative to maintain said valve in the closed position during the landing condition of the aircraft when said casings are initially relatively telescoped and the pressure in said second chamber is higher than the pressure in said first chamber.

8. A shock absorber as set forth in claim 7 wherein said second and third means comprise a differential plunger head slidably mounted in said metering pin in operative relation to said second path forming means and said first means comprises a spring biasing said plunger head to the closed position.

9. A shock absorber as set forth in claim 8 wherein said metering pin comprises a closed end and an open end, the latter in communication with said second chamber, said second path forming means comprising bypass ports near said closed end, and further including a passage adjacent said closed end in communication with said first chamber for exposing one side of said plunger head to fluid in said first chamber.